United States Patent [19]

Whitehead

[11] Patent Number: 5,155,746
[45] Date of Patent: Oct. 13, 1992

[54] CLOCK SYNCHRONIZATION SCHEME FOR DIGITAL TRANSMISSION

[75] Inventor: Joseph L. Whitehead, Decatur, Tex.

[73] Assignee: Reliance Comm/Tec Corporation, Chicago, Ill.

[21] Appl. No.: 461,814

[22] Filed: Jan. 8, 1990

[51] Int. Cl.$^5$ ............................................. H04L 7/06
[52] U.S. Cl. .................................. 375/111; 375/109; 340/105.5; 455/69
[58] Field of Search ............... 375/111, 109, 113, 114, 375/119; 370/103, 105.1–105.4, 105.5; 455/51, 49, 58, 69, 70; 328/63, 73.55; 340/825.2, 825.21

[56] References Cited

U.S. PATENT DOCUMENTS

| | | | |
|---|---|---|---|
| 4,196,416 | 4/1980 | Stein | 375/11 |
| 4,672,447 | 6/1987 | Möring et al. | 375/111 X |
| 4,709,402 | 11/1987 | Akerberg | 455/69 |
| 4,727,370 | 2/1988 | Shih | 375/109 |

*Primary Examiner*—Curtis Kuntz
*Assistant Examiner*—Tesfaldet Bocure
*Attorney, Agent, or Firm*—Michael M. Rickin

[57] ABSTRACT

A clock synchronization scheme for synchronizing a remote terminal to a distantly located central office terminal. In order to obtain synchronization, the central office terminal repetitively transmits a frame which has in it only one synchronization bit located in a predetermined position. The remote terminal includes a voltage connected oscillator whose output is used to determine when the predetermined bit position should be received from the central office terminal. The remote terminal controls the frequency of the oscillator based on the phase and frequency difference between the actual received synchronization bit and the bit position that the terminal says that bit should be received in. Once synchronization is achieved, the central office terminal transmits in each frame a three bit window which includes the synchronization bit. The remote terminal then searches each frame for the three bit window as long as synchronization is maintained.

15 Claims, 2 Drawing Sheets

CLOCK SYNCHRONIZATION SCHEME FOR DIGITAL TRANSMISSION

BACKGROUND OF THE INVENTION

1. Field of the Invention

This invention relates to synchronizing a receiver to a transmitter by use of a phase locked loop (PLL) and more particularly to such synchronization which is accomplished by using a portion of the data bit stream for the synchronization pulses.

2. Description of the Prior Art

The use of optical fiber in the telecommunications industry has grown. One proposed use is in a system to provide service to a multiplicity of subscribers. The use of optical fiber in such systems is attractive as the fiber has a wide bandwidth which allows both traditional telecommunication services (voice and data) and video service to be provided to the subscriber. The traditional telecommunication services can be provided in such a system by using a digital transmission scheme.

In a system designed to provide such service over optical fiber to subscribers, it has been decided to use the 850 nm wavelength so that relatively inexpensive light emitting diodes (LEDs) can be used instead of lasers. As in all such systems, it is necessary that both ends of the system be synchronized with each other at all times. It is desirable that such synchronization be accomplished in a relatively easy and simple manner. It is also desirable that PLLs be used in achieving synchronization. It is further desirable that during the time synchronization is being achieved, the system minimize the on time of the LED. This minimizes LED power consumption.

The synchronization scheme described herein meets those requirements. Inherent to such a scheme is that LED on time and power consumption are also both minimized after synchronization has been achieved during those intervals when nothing is being transmitted to the subscribers.

SUMMARY OF THE INVENTION

A clock synchronization circuit for the first terminal of a digital transmission system. The first terminal repetitively receives from a distant second terminal of the system, data in frames. Each of the frames has a predetermined number of equal width time slots. Prior to synchronization with the second terminal the first terminal repetitively receives from the second terminal a frame which has only a single synchronization bit in a predetermined one of the time slots. The synchronization circuit uses the single synchronization bit to achieve synchronization with the second terminal.

The circuit includes an oscillator for generating a periodic signal whose period is equal to the width of any one of the equal width time slots. The periodic signal has an adjustable frequency. The circuit further includes circuitry which responds to the periodic signal for determining an interval of time equal in duration to any one of the time slot widths. During the duration of the time interval the predetermined one of the time slots having the single synchronization bit should be received at the first terminal. The circuitry generates a signal indicative of the time interval duration.

The circuit also further includes a phase comparator for generating a control signal which has an amplitude and phase dependent on the difference in phase and frequency between the indicative signal and the received signal synchronization bit. The oscillator responds to the control signal for adjusting the frequency of the periodic signal so that the first terminal achieves synchronization with the second terminal.

DESCRIPTION OF THE PREFERRED EMBODIMENT

Figure 1:
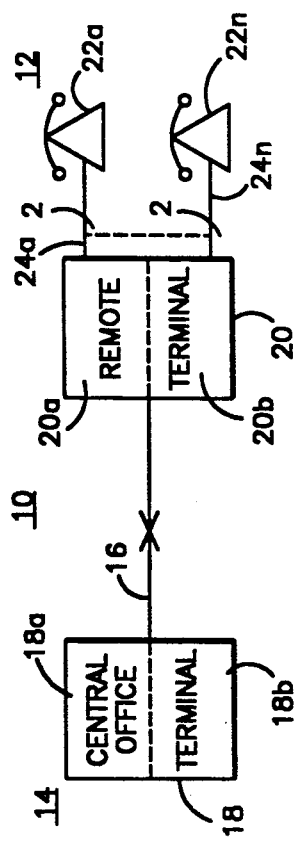
FIG. 1 shows a block diagram of a system which provides service to a multiplicity of subscribers.

Referring now to FIG. 1 there is shown a simplified block diagram for a system 10 which uses pulse code modulation (PCM) to provide telephone service to a multiplicity of subscribers 12 who are connected to a central office 14 by a cable 16. More specifically, system 10 includes at central office 14 a central office terminal (COT) 18 and at subscribers 12 a remote terminal (RT) 20. Each of the subscribers 12 are shown symbolically in FIG. 1 by their associated telephones 22a and 22n which are connected to RT 20 by the associated drop wire pairs 24a to 24n.

COT 18 and RT 20 both include transmitter and receiver portions 18a, 18b and 20a, and 20b, respectively. As will be described in more detail hereinafter, system 10 does not transmit any data until after the receiver portion of one terminal has become synchronized to the transmitter portion of the other terminal. Also as will be described in more detail, the transmitter portion dedicates the same one bit position in each frame as the synchronizing bit (hereinafter "sync bit") and maintains that bit to always have the same polarity. After synchronization has been achieved the transmitter portion dedicates the bits just prior t and just after the sync bit to always have a polarity opposite to that of the sync bit. The receiver portion at the other terminal is allowed to search the entire frame for the sync bit until synchronization is obtained. Thereafter and for as long as synchronization is maintained, the receiver portion is limited to the three bit window made up of the sync bit and the opposite polarity bits just before and after the sync bit.

Figure 2:
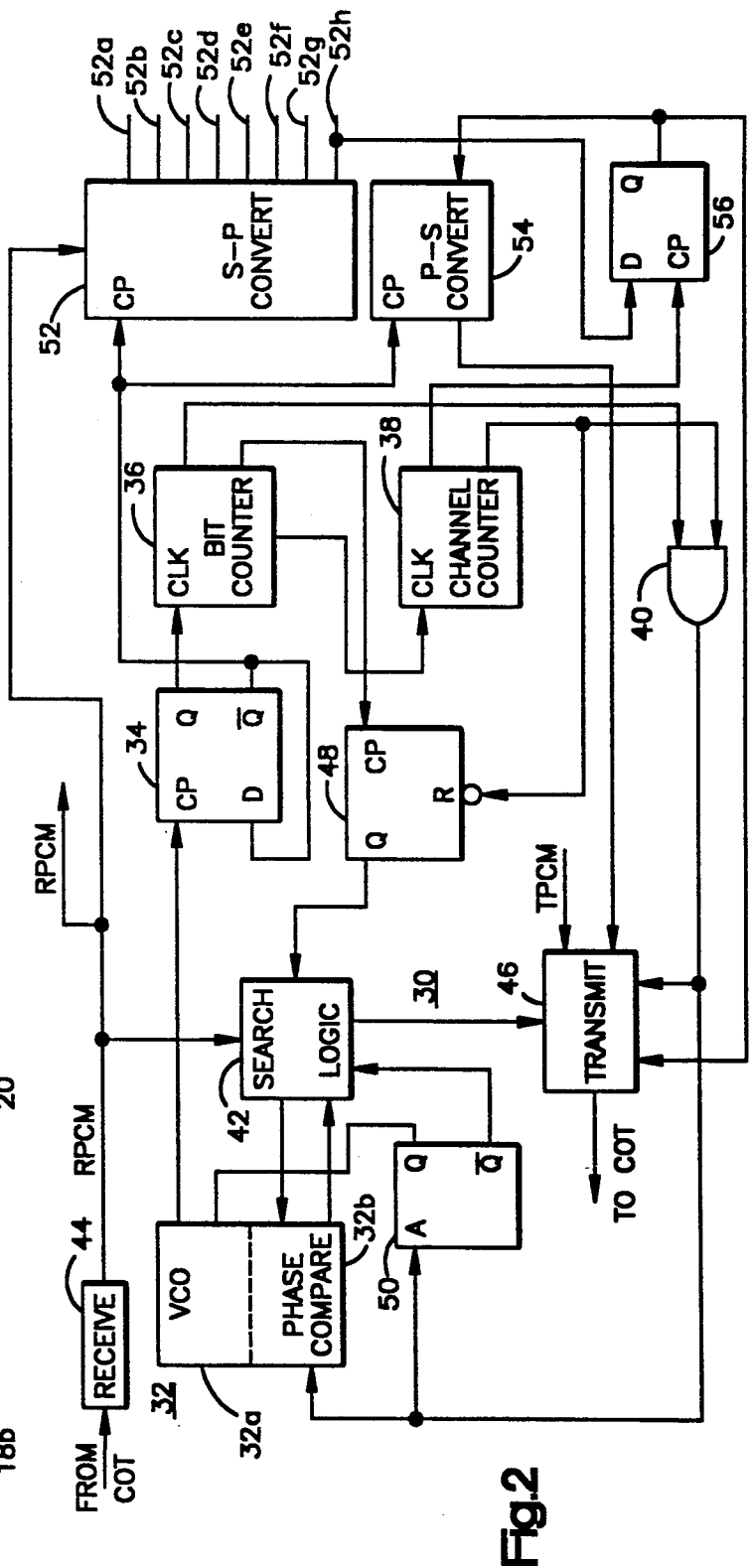
FIG. 2 shows a schematic diagram for the synchronization circuit of the present invention.

Referring now to FIG. 2, there is shown a schematic diagram for the synchronization circuit 30 of the present invention. For purposes of describing the operation of circuit 30, it is assumed that in system 10 the COT 18 is the master and the RT 20 is the slave. It is further assumed that the sync bit is a one and that the bits occurring just prior to and just after the sync bit are a zero. It is to be understood that these assumptions are made solely for purposes of description and are not meant to limit the scope of my invention.

In one specific embodiment for system 10 in which circuit 30 is used, the system provides service for six of subscribers 12. In that system, the master clock frequency is 1.536 MHz, the bit rate is 768 Kbs and the frame rate is 8 KHz. Therefore, in that system, each frame has 96 bits (768 Kbs divided by 8 KHz) and each bit has a period of about 1.3 useconds (the inverse of 768 Kbs).

Each channel of system 10 used to provide service to the six of subscribers 12 has a capacity of ten (10) bits. Eight of those ten bits are used to transmit data to the subscriber and the other two bits n each channel are not used. System 10 also has two additional channels which can be used to provide service for up to eight of subscribers 12. Therefore, 80 bits of each 96 bit frame in system 10 are associated with providing service to actual or potential subscribers 12.

Each frame of system 10 also has one channel of ten bit capacity which includes three bits that are used to address one of the up to eight subscriber channels. That channel also includes four bits that are used to provide signalling information for the addressed channel. That channel also includes one bit which is known as a "handshake" bit whose function will be described hereinafter and two other bits which are not used.

Each frame of system 10 also has six bits which are associated with a tenth channel. Three of those bits are not used. The other three are the three bit window, i.e., the sync bit and its associated opposite polarity bits which are transmitted just prior to an just after the sync bit.

Figure 3:
FIG. 3 is a table showing channel numbers versus bit positions for each frame used to transmit information to and from the subscribers of the system of FIG. 1.

To aid in an understanding of system 10 and the operation of circuit 30, there is shown in FIG. 3 a table of channel numbers versus bit positions. In the table, the channels are numbered on the vertical from zero (0) at the top of nine (9) at the bottom and the bit positions are numbered on the horizontal from one (1) of the left to ten (10) at the right. An "X" in the table in a bit position indicates that the bit is not used. The three bits of channel zero used for the channel address are indicated by C0, C1 and C2 while the four bits used in channel zero for signalling information are indicated by A, B, C and D. The handshake bit is indicated by A, B, C and D. The handshake bit is indicated by an H. The eight bits used in channels one to eight for the transmission of data, i.e. encoded voice, are indicated by D0, D1, D2, D3, D4, D5, D6 and D7. The sync bit of channel nine is indicated by an S while the bits just prior to and after that bit are each shown as a zero.

The present invention accomplishes synchronization of RT 20 to COT 18 by first transmitting in each frame only the sync bit from the COT to the RT. Circuit 30 includes a voltage controlled oscillator (VCO) 32a and phase comparator 32b. The phase comparator is allowed to continuously search the entire received signal for the sync bit until phase lock, i.e., synchronization is achieved. When tat occurs, the RT informs the COT and also therefore limits the phase comparator to search each frame only for the three bit window as long as synchronization is maintained.

When the COT is informed that the RT has achieved phase lock, an identical circuit at the COT will phase lock on the signal from the RT. Data transmission is then enabled from the COT to the RT. In that data transmission, the COT includes the handshake (H) bit. That bit is decoded at the RT to enable data transmission from the RT to the COT.

In order for the circuit 30 to search the received frame for the sync bit and accomplish phase lock, it is necessary that circuit 30 determine the time when the sync bit should be received from the COT. To that end, VCO 32a generates a signal having a nominal frequency of 1.536 MHz which is divided by two by flip-flop 34 to provide a signal to the clock input of counter 36 having a nominal frequency of 768 KHz. Counter 36 is used to count bits and it is connected to counter 38 which is used to count channels. Counter 36 and 38 may then be used to indicate occurrence of the sync bit. It should be appreciated that until phase lock is achieved counters 36 and 38 are counting locally derived, i.e. generated only in RT 20, bits and channels and therefore counters 36 and 38 may be used to indicate the occurrence of the locally generated sync bit position.

Figure 2A:
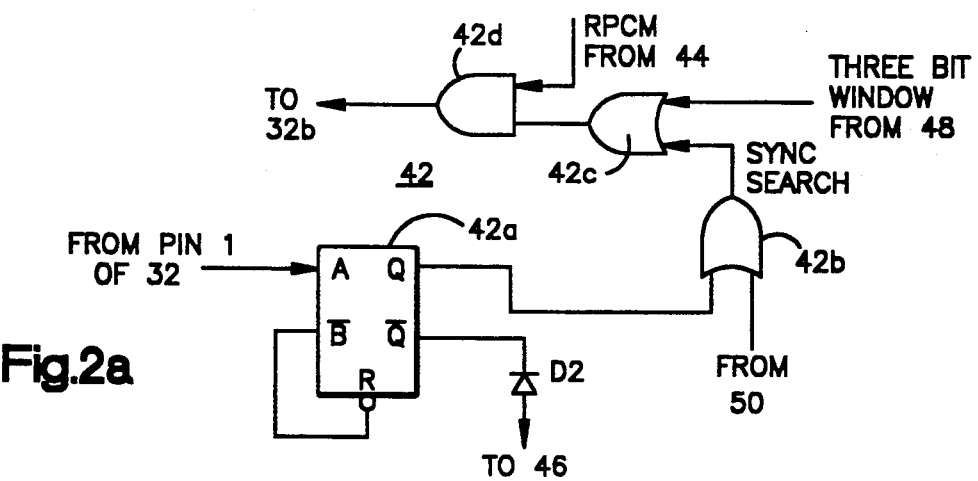
FIG. 2a shows a schematic diagram of one embodiment for the search logic of the synchronization circuit.

Two input AND gate 40 has one input connected to counter 36 and the other input connected to counter 38. Gate 40 is used to decode locally generated bit 95, i.e. gate 40 decodes the local occurrence of the sync bit. The output of gate 40, which is connected to one of the two inputs to phase comparator 32b, then goes high for one bit period (1.3 useconds) to represent the occurrence of the locally generated sync bit. The other input to comparator 32b is connected by search logic 42 to the output of receiver 44. One embodiment for logic 42 is shown in FIG. 2a and is described in detail below.

Comparator 32b compares the phases of the signals at its two inputs. The output of the phase comparator is a dc voltage whose amplitude is related to the phase and the frequency of the signals at its inputs. That dc voltage is connected to the control input of VCO 32a to adjust the frequency of the signal generated by the VCO until the two inputs to comparator 32b are aligned in both frequency and phase.

VCO 32a and phase comparator 32b may be implemented by a type 74HC4046 chip available from National Semiconductor. That chip provides an output pin 1 thereof pulses which are present as long as the inputs to comparator 32b are out of phase. As shown in FIG. 2a, search logic 42 includes monostable multivibrator circuit 42a whose input is connected to receive the pulse from pin 1 of the VCO and phase comparator chip.

The period of the astable state of circuit 42a is selected to be 250 mseconds. As the sync bit occurs once every 125 useconds (the time for one frame), the pulses from pin 1 occur at a rate which is 2,000 times faster than is necessary to ensure that circuit 42a will not time out as long as the inputs to comparator 32b are out of phase. Therefore, during the search for the sync bit from COT 18 and for 250 ms after synchronization has been achieved, circuit 42a will remain in its astable state.

When circuit 42a is in its astable state, its Q output is high. That output is connected to one of the two inputs to OR gate 42b to generate at the output thereof a signal named SYNC SEARCH. That signal, which remains high for as long as circuit 42a is in its astable state, is connected through OR gate 432c to one input of AND gate 42d. The other input to gate 42d is connected to receiver 44 to receive the frames transmitted from COT 18. The output of gate 42d is connected to one of the two inputs of comparator 32b.

When phase lock has been achieved, the pulses from pin 1 of the VCO and comparator chip cease. Monostable circuit 42a will then be allowed to time out provided that within its 250 ms astable period, phase lock is maintained. If during that period, phase lock is lose even for one frame, a pulse will be generated at pin 1 and circuit 42a will restart its astable period. When circuit 42a is allowed to time out, both the Q output of the circuit and the SYNC SEARCH signal go low and log 42 is no longer enabled to search the entire received frame.

When circuit 42a is in its astable state, its not Q output is low. That output is connected by diode D2 to the transmit portion 46 of circuit 30 to inhibit the transmission of data from RT 20 to COT 18 while circuit 30 is attempting to achieve phase lock. Once phase lock has been achieved and circuit 42a has timed out, its not Q output goes high and transmission of data to the COT by transmit portion 46 is no longer inhibited. At that time, the only data available at the RT to be transmitted to the COT is locally derived bit 95, i.e. the sync bit. That bit is used by the COT to synchronize its receiver portion to the transmit portion of the RT. Such synchronization is necessary because the propagation delay in the transmission medium 16 connecting the RT and COT varies with distance.

While not shown in any of the figures, the COT includes a circuit which is identical to the circuit 30 for phase locking to the signal transmitted from the RT. Once that phase lock has been achieved, the COT generates and transmits in its associated bit position (see FIG. 3), the handshake bit. As can be seen from FIG. 3, the handshake bit is the first used bit in each frame to be received at the RT. RT 20 includes eight bit serial to parallel (S-P) converter 52 and the handshake bit is the first of eight bits to be loaded into the converter. Converter 52 has output pins 52a to 52h and the handshake bit appears at pin 52h. The channel address bits appear at pins 52e, 52f and 52g; and the signalling bits appears at pins 52a, 52b, 52c and 52d.

Pin 52h is connected to the D input of handshake bit latch 56. The clock pulse (CP) input of the latch is connected to one of the outputs of channel counter 38. The handshake bit is clocked into the latch. The Q output of the latch goes high to enable the transmit portion 46 of the RT. The Q output of the latch is also connected to parallel to serial (P-S) converter 54 and the handshake bit is also loaded into that converter so that it can be transmitted back to the COT in the same time slot of the next frame. Upon receipt of that bit at the COT, an alarm (not shown) is deactivated and two-way communication between the COT and RT is now possible. S-P converter 52 and P-S converter 54 may be implemented using the type 74HC164 and 74HC165 chips, respectively. Both of the chips are available from a number of manufacturers including National Semiconductor.

Circuit 30 includes window decode latch 48. The clock pulse (CP) input of the latch is connected to bit counter 36 and the rest (R) of the latch is connected to the channel counter 38. The Q output of latch 48 goes high upon the occurrence of the first bit (bit 94) of the three bit window and remains high for the entire window. As shown in FIG. 2a, that Q output is connected through OR gate 42c to one input of AND gate 42d. The other input of gate 42d is connected to receiver 44. As the COT and RT are synchronized, the three bits of the received window are connected to one input of the comparator 32b. The other input to the comparator is connected to the output of gate 40 which decodes the occurrence of the sync bit time slot generated in the RT. Therefore, for as long as synchronization is maintained, the phase comparator is limited to the three bit window.

As described above, once synchronization has been achieved, the not Q output of circuit 42a goes high to remove the inhibit from transmit portion 46. Data can then be transmitted from the RT to the COT. As shown in FIG. 2, the output of RT sync bit decode gate 40 is also connected to transit portion 46. Therefore, the locally generated sync bit is transmitted from the RT to the COT in bit position 95 of the frame.

Figure 2B:
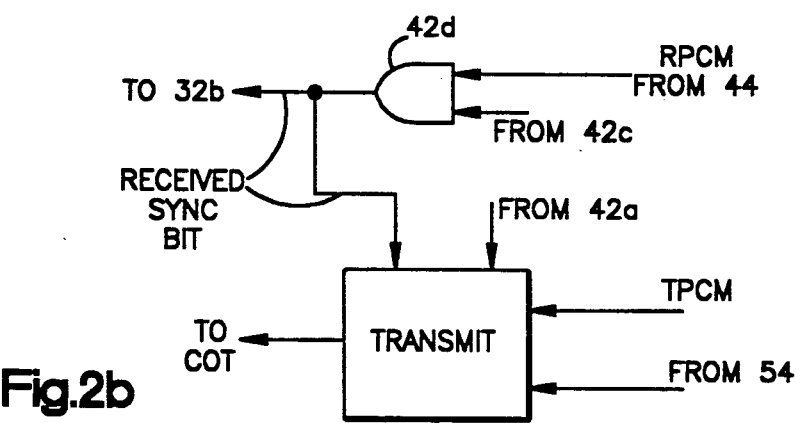
FIG. 2b shows a schematic diagram of a portion of FIGS. 2 and 2a wherein alternate connections have been made so that the received synchronization bit can be retransmitted to the terminal from which it was received.

I have found that the sync bit received at the RT from the COT can be retransmitted to the COT in place of the locally generated sync bit. That change can easily be accomplished in circuit 30 by opening the connection of the output of gate 40 to the transmit portion 46 and by connecting the output of gate 42d (which is the received sync bit) to the transmit portion 46. FIG. 2b shows the schematic diagram of that part of FIGS. 2 and 2a with the connections described above. This retransmission of the received sync bit in place of the locally generated sync bit ensures that any jitter associated with the RT PLL is not transmitted to the COT.

A loss of synchronization at the RT causes the received sync bit to be out of phase with the locally generated sync bit. That results in the output of a pulse on pin 1 of the VCO and phase comparator circuit 32. Monostable circuit 42a is then triggered to its astable state. As the not Q output of circuit 42a goes low, the transmission of data to the COT is disabled. Simultaneously, the SYNC SEARCH signal is enabled and circuit 30 once again searches the entire frame received from the COT for the sync bit. The COT recognizes the loss of data transmission for the RT and ceases transmitting data to the RT. The COT does, however, continue to transmit the sync bit so that the RT can reestablish synchronization in the manner described above.

A loss of synchronization at the COT causes the COT to cease data transmission to the RT. Part of the data that the COT had been transmitting to the RT is the handshake (H) bit. The loss of that bit at the RT is detected by circuit 56 and its Q output goes low. The going low of that output disables the transmission of data to the COT. The sync bit, whether locally generated or a retransmission of the bit received form the COT, is still transmitted to the COT. Once the COT achieves phaselock with the RT, it transmits the handshake bit. As described above, the RT retransmits that bit to the COT in the next frame following the one in which it is received.

Circuit 30 also includes retriggerable monostable multivibrator circuit 50 which is used to provide dependable start-up of circuit 32. As shown in FIG. 2a, the output of AND gate 42d is dc coupled to one input of phase comparator 32b. As shown in FIG. 2, the output of AND gate 40 is dc coupled to the other input of the phase comparator. Therefore, in the absence of signals at the output of those gates, the inputs to the phase comparator are clamped to ground. Signals cannot be provided to the inputs of those gates until VCO 32a starts. Thus, circuit 30 needs a mechanism to ensure start-up of the VCO and phase comparator circuit 32. Circuit 50 provides that mechanism.

The A or trigger input to multivibrator circuit 50 is connected to the output of AND gate 40. The not Q output of circuit 50 is connected to one input or OR gate 42b. The output of gate 40 not only clamps the input of comparator 32a to ground, but also clamps the A input of circuit 50 to ground. Therefore, the not Q output of circuit 50 is high and this enables the SYNC SEARCH signal through gate 42b. This in turn allows gate 42d to pass the sync bit received from the COT to one input of comparator 32b.

The Q output of circuit 50 is connected by diode D1 and resistor R1 to the VCO 32a. As the Q output is low, this connection provides a temporary bias to the VCO to ensure that its operating frequency at start-up is within the necessary range to achieve synchronization. The VCO then generates the signal to clock flip-flop 34 and cause counters 36 and 38 to count locally generated bits and channels, respectively. The detection of the locally generated sync bit by gate 40 causes the multivibrator circuit 50 to be triggered so that its Q output goes high and its not Q output goes low. This change in state of the Q output reverse biases diode D1 to return control of the VCO to the phase comparator. Simultaneously, an output is provided at pin 1 of circuit 32 to return control of the SYNC SEARCH signal to circuit 42a. Circuit 50 has no further affect on the operation of circuit 30.

It is to be understood that the description of the preferred embodiment is intended to be only illustrative, rather than exhaustive, of the present invention. Those of ordinary skill will be able to make certain additions, deletions, and/or modifications to the embodiment of the disclosed subject matter without departing from the spirit of the invention or its scope, as defined by the appended claims.

What is claimed is:

1. A clock synchronization circuit for a first terminal of a digital transmission system, said first terminal having means for receiving data from a distant second terminal of said system and means for transmitting data to said second terminal, said first terminal repetitively receiving at said receiving means data in frames from said distant second terminal, each of said frames having a predetermined number of equal width time slots, said first terminal prior to synchronization with said second terminal repetitively receiving at said receiving means from said second terminal a frame having only a single synchronization bit in a predetermined one of said time slots, said clock synchronization circuit using said single synchronization bit to achieve synchronization with said second terminal, said clock synchronization circuit comprising:
   a) means for generating a periodic signal having a period equal to said width of any of said equal width time slots, said periodic signal having an adjustable frequency;
   b) means responsive to said periodic signal for determining an interval of time equal in duration to any one of said time slot widths during which said predetermined one of said time slots having said single synchronization bit should be received at said first terminal receiving means and generating a signal indicative of said interval of time; and
   c) means for generating a control signal having an amplitude and phase dependent on the deference in phase and frequency between said indicative signal and said received single synchronization bit, said periodic signal generating means responsive to said control signal for adjusting said periodic signal frequency so that said first terminal achieves synchronization with said second terminal.

2. The circuit of claim 1 wherein each of said frames has a predetermined number of channels each having a predetermined number of said equal width time slots one of which is said predetermined one of said time slots which has said single synchronization bit and said means for determining an interval of time equal in duration to any one of said time slot widths during said predetermined one of said time slots having said single synchronization bit should be received at said first terminal receiving means comprises:
   i) first means responsive to said periodic signal for counting when both said predetermined number of equal width time slots for each of said predetermined number of channels and said predetermined number of channels should be received at said first terminal receiving means and generating signals indicative thereof; and
   ii) means responsive to said indicative signals generated by said first counting means for generating said signal indicative of said interval of time during which said predetermined one of said time slots having said single synchronization bit should be received at said first terminal receiving means.

3. The circuit of claim 1 wherein said control signal generating means compares the phase of said signal indicative of said interval of time during which said predetermined one of said time slots having said single synchronization bit should be received to the phase of said received single synchronization bit.

4. The circuit of claim 3 wherein said control signal is a dc voltage.

5. The circuit of claim 1 wherein said control signal generating means also generates a further signal each time said control signal is generated and said means for determining an interval of time equal in duration to any one of said time slot widths during which said predetermined one of said time slots having said single synchronization bit should be received at said receiving means comprises means responsive to said further signal for connecting at least the next frame received at said receiving from said second terminal to said control signal generating means.

6. The circuit of claim 5 wherein each of said frames has a predetermined number of channels each having a predetermined number of said equal width time slots one of which is said predetermined one of said time slots which has said single synchronization bit and said means for determining an interval of time equal in duration to any one of said time slot widths during which said predetermined one of said time slots having said single synchronization bit should be received at said receiving means also comprises:
   i) first means responsive to said periodic signal for counting when both of said predetermined number of equal width time slots for each of said predetermined number of channels and said predetermined number of channels should be received at said first terminal receiving means and generating signals indicative thereof; and
   ii) means responsive to said indicative signals generated by said first counting means for generating said signal indicative of said interval of time during which said predetermined one of said time slots having said single synchronization bit should be received at said first terminal receiving means.

7. The circuit of claim 1 wherein after said first terminal has achieved synchronization with said second terminal said first terminal no longer repetitively receives at said receiving means frames from said second terminal having only a single synchronization bit and instead repetitively receives at said receiving means from said second terminal a frame having said predetermined number of equal width time slots and also having at least said single synchronization bit located in said predetermined synchronization bit time slot surrounded by one time slot on either side each of which have a predetermined bit, said clock synchronization circuit using said received single synchronization bit and said surrounding predetermined bits to maintain synchronization with said second terminal, said means for determining an interval of time equal in duration to any one of said time slot widths during which said predetermined one of said time slots having said single synchronization bit should be received at said first terminal receiving means is responsive to said periodic signal after synchronization is achieved for generating a signal indicative of an interval of time during which said single synchronization bit and said surrounding predetermined bits should be received at said first terminal receiving means, said control signal generating means for generating in response to said signal indicative of said time interval of time during which said single synchronization bit and said surrounding predetermined bits should be received at said first germinal receiving means and said received single synchronization bit and said surrounding predetermined bits said control signal with an essentially zero amplitude as long as synchronization is maintained.

8. The circuit of claim 1 wherein said first terminal is capable of transmitting data from said transmitting means to said second terminal and said control signal generating means also generates a further signal each time said control signal is generated and said means for determining an interval of time equal in duration to any one of said time slot widths during which said predetermined one of said time slots having said single synchronization bit should be received at said first terminal receiving means includes means responsive to said further signal for inhibiting transmission of data from said first terminal transmitting means to said second terminal until a predetermined period of time has expired, said data transmission from said first terminal to said second terminal necessary for said second terminal to synchronize itself with said first terminal.

9. The circuit of claim 8 wherein said means for inhibiting data transmission is also responsive to said further signal for connecting at least the next frame received at said receiving means from said second terminal to said control signal generating means.

10. The circuit of claim 8 wherein said first terminal repetitively receives at said receiving means from said second terminal after said first and second terminals are synchronized to each other a frame having at least a handshake bit located in a predetermined one of said time slots and said means for determining an interval of time equal in duration to any one of said time slot widths during which said predetermined one of said time slots having said single synchronization bit should be received at said first terminal receiving means further includes means responsive to said received handshake bit for enabling said data transmission.

11. A method for synchronizing a first terminal of a digital transmission system to a distant second terminal of said system, said first terminal having means for receiving data from said distant second terminal and means for transmitting data to said second terminal, said first terminal repetitively receiving at said receiving means data in frames from said second terminal each of said frames having a predetermined number of equal width time slots, said first terminal prior to synchronization with said second terminal repetitively receiving at said receiving means from said second terminal a frame having only a single synchronization bit in a predetermined one of said time slots, said clock synchronization circuit using said single synchronization bit to achieve synchronization with said second terminal, said method comprising the steps of:

a) generating at said first terminal a periodic signal having a period equal to said width of any one of said equal width time slots, said periodic signal having an adjustable frequency;

b) determining from said periodic signal an interval of time equal in duration to any one of said time slots widths during which said predetermined one of said time slots having said single synchronization bit should be received at said first terminal receiving means and generating a signal indicative of said interval of time;

c) generating a control signal having an amplitude and phase dependent on the difference in phase and frequency between said indicative signal and said received single synchronization bit; and d) adjusting in response to said control signal said periodic signal frequency so that said first terminal achieves synchronization with said second terminal.

12. The method of claim 11 wherein each of said frames has a predetermined number of channels each having a predetermined number of said equal width time slots one of which is said predetermined one of said time slots which has said single synchronization bit and said step for determining an interval of time equal in duration to any one of said time slot widths during which said predetermined one of said time slots having said single synchronization bit should be received at said first terminal receiving means comprises the steps of:

i) counting said periodic signal to determine when both said predetermined number of equal width time slots for each of said predetermined number of channels and said predetermined number of channels should be received at said first terminal receiving means and generating signals indicative thereof; and ii) generating in response to said indicative signals of step i) above, said signal indicative of said interval of time slot during which said predetermined one of said time slots having said single synchronization bit should be received at said first terminal receiving means.

13. The method of claim 11 wherein after said first terminal has achieved synchronization with said second terminal said first terminal no longer repetitively receives at said receiving means frames from said second terminal having only a single synchronization bit and instead repetitively receives at said receiving means from said second terminal a frame having at least said single synchronization bit located n said predetermined synchronization bit time slot surrounded by one time slot on either side each of which have a predetermined bit, said clock synchronization circuit using said received single synchronization bit and said surrounding predetermined bits to maintain synchronization with said second terminal, said method comprising the steps of:

i) generating in response to said periodic signal a signal indicative of an interval of time during which said single synchronization bit and said surrounding predetermined bits should be received at said first terminal receiving means; and ii) generating at said control signal generating means in response to said signal indicative of said interval of time when said synchronization bit and said surrounding predetermined bits should be received at said first terminal receiving means and said received single synchronization bit and said surrounding predetermined bits said control signal with an essentially zero amplitude as long as synchronization is maintained.

14. The method of claim 11 wherein said step of generating a control signal further comprises also generating a further signal each tie said control signal is generated; and said method further comprises the step of connecting in response to said further signal at least the next frame received at said receiving means from said second terminal to said control signal generating means.

15. The method of claim 14 wherein each of said frames has a predetermined number of channels each having a predetermined number of said equal width tie slots one of which is said predetermined one of said time slots which has said single synchronization bit and said step for determining an interval of time equal in duration to anyone of said time slot widths during which said predetermined one of said time slots having said single synchronization bit should be received at said first terminal receiving means comprises the steps of:

i) counting said periodic signal to determine when both said predetermined number of equal width time slots for each of said predetermined number of channels and said predetermined number of channels should be received at said first terminal receiving means and generating signals indicative thereof; and ii) generating in response to said indicative signals of step i) above, said signal indicative of said interval of time during which said predetermined one of said time slots having said single synchronization bit should be received at said first terminal receiving means.

* * * * *